United States Patent
Carroll, III et al.

(10) Patent No.: US 7,334,399 B2
(45) Date of Patent: Feb. 26, 2008

(54) APPARATUS, SYSTEM, AND METHOD FOR INTERMITTENTLY DELIVERING FLUID

(75) Inventors: John T. Carroll, III, Columbus, IN (US); Laszlo D. Tikk, Columbus, IN (US)

(73) Assignee: Fleetguard, Inc, Nashville, TN (US)

( * ) Notice: Subject to any disclaimer, the term of this patent is extended or adjusted under 35 U.S.C. 154(b) by 35 days.

(21) Appl. No.: 11/156,682

(22) Filed: Jun. 20, 2005

(65) Prior Publication Data

US 2006/0283177 A1    Dec. 21, 2006

(51) Int. Cl.
*F01N 3/00* (2006.01)
*F02M 69/46* (2006.01)
*F02D 1/06* (2006.01)

(52) U.S. Cl. .......... 60/286; 60/295; 123/456; 239/5

(58) Field of Classification Search .......... 60/286, 60/295; 239/5; 123/456
See application file for complete search history.

(56) References Cited

U.S. PATENT DOCUMENTS

| | | | | |
|---|---|---|---|---|
| 3,761,229 A | * | 9/1973 | Schwartz | .......... 422/105 |
| 6,209,315 B1 | * | 4/2001 | Weigl | .......... 60/274 |
| 6,513,323 B1 | * | 2/2003 | Weigl et al. | .......... 60/286 |
| 6,834,496 B2 | * | 12/2004 | Nakatani et al. | .......... 60/274 |
| 6,922,988 B2 | * | 8/2005 | Yamaguchi et al. | .......... 60/286 |
| 7,069,721 B2 | * | 7/2006 | Gotou | .......... 60/297 |

* cited by examiner

*Primary Examiner*—Thomas Denion
*Assistant Examiner*—Loren Edwards
(74) *Attorney, Agent, or Firm*—Kunzler & McKenzie

(57) ABSTRACT

An apparatus, system, and method are disclosed for intermittently delivering fluid. An injector intermittently delivers a first quantity of fluid over a first time interval. In one embodiment, the injector is passively cooled. In a certain embodiment, the injector delivers the first quantity of fluid responsive to a fluid flow measurement of a flow meter. An orifice diverts the first quantity of fluid from a primary fluid supply system over a second time interval without decreasing the supply of fluid to a primary load within a flow rate range while the fluid pressure remains within a pressure range. An accumulator accumulates at the least the first quantity of fluid as a fluid charge with positive energy.

21 Claims, 14 Drawing Sheets

APPARATUS, SYSTEM, AND METHOD FOR INTERMITTENTLY DELIVERING FLUID

BACKGROUND OF THE INVENTION

1. Field of the Invention

This invention relates to delivering fluid and more particularly relates to intermittently delivering fluid with minimal disruption to a primary fluid supply system.

2. Description of the Related Art

A mechanical device such as an internal combustion engine often includes a primary fluid supply system. For example, a diesel engine may include a fuel supply system to deliver fuel from a storage tank to a fuel injection system. The mechanical device typically requires the primary fluid supply system to deliver the fluid within specified flow rate and pressure ranges. Devices receiving the fluid often only function properly if the fluid is within the specified flow rate and pressure ranges. The primary fluid supply system may require one or more pumps, filters, regulators, controllers, and the like to supply the fluid within the specified flow rate and pressure ranges.

The mechanical device may also have a secondary use for the fluid. For example, a catalytic converter of an internal combustion engine is often regenerated by intermittently injecting fuel into the exhaust gas upstream of the converter. Unfortunately, the intermittent diversion of fuel from a primary fluid supply system demand such as a fuel supply system may reduce the flow rate and fluid pressure below the specified flow rate and pressure ranges. As a result, the mechanical device may require a separate auxiliary fluid supply system including additional pumps, filters, regulators, and controllers to supply the secondary fluid use without disrupting the primary fluid supply system demand.

Unfortunately, adding an auxiliary fluid delivery system increases the component, reliability, and packaging costs associated with satisfying the secondary fluid use. For example, in a diesel engine, providing a separate auxiliary fluid supply system to deliver fuel to a catalytic converter increases the cost of exhaust emission control.

A fluid delivery system such as the auxiliary fluid delivery system may need to intermittently deliver precise quantities of fluid. For example, the reductant fluid delivery system of a catalytic converter may only deliver reductant for a second every minute. Yet the quantity of reductant may need to be precisely controlled. Excess reductant may result in excess unburned hydrocarbon emission in the exhaust while insufficient reductant may not adequately regenerate the catalytic converter resulting in increased emission of nitrogen oxides ("NOX").

The fluid delivery system may employ a closed loop control system to increase the precision of the fluid delivery. The closed loop control system may include a flow sensor and a control module. The flow sensor measures the fluid flow rate and the control module adjusts the delivery of fluid so as to deliver the precise, required amount of fluid.

Unfortunately, current flow sensors typically only precisely measure the fluid flow rate when averaged over a lengthy time interval. Measurements of intermittent fluid flows are often less precise, decreasing the effectiveness of closed loop control. In addition, current flow sensors may be unable to supply diagnostic information in addition to the fluid flow rate, such as a flow failure. Finally, current flow sensors are typically not easily packaged within fluid lines and injectors.

In addition, cooling the injector may further add to the costs of delivering fluid diverted from the primary fluid supply system. For example, the injector may require additional cooling components such as coolant lines and the like.

From the foregoing discussion, it should be apparent that a need exists for an apparatus, system, and method for intermittently delivering fluid that employ a primary fluid supply system without disrupting the primary fluid supply system's capabilities to service the primary fluid supply system demand. In addition, such an apparatus, system, and method would preferably precisely measure the delivered fluid flow and efficiently cool the injector. Beneficially, such an apparatus, system, and method would reduce the costs associated with secondary uses of a fluid.

SUMMARY OF THE INVENTION

The present invention has been developed in response to the present state of the art, and in particular, in response to the problems and needs in the art that have not yet been fully solved by currently available intermittent fluid delivery systems. Accordingly, the present invention has been developed to provide an apparatus, system, and method for intermittent fluid delivery that overcome many or all of the above-discussed shortcomings in the art.

The apparatus to intermittently deliver fluid is provided with a plurality of modules configured to functionally execute the necessary steps of intermittently delivering a first quantity of fluid, diverting the first quantity of fluid, and accumulating at least the first quantity of fluid. These modules in the described embodiments include an injector, an orifice, and an accumulator.

The injector intermittently delivers a first quantity of fluid over a first time interval. In one embodiment, the injector comprises a valve, a meter, and a nozzle. The value may control the flow of fluid from the injector. The meter may measure the fluid flow through the valve. The nozzle may atomize and disperse the fluid.

The orifice diverts the first quantity of fluid from a primary fluid supply system over a second time interval. The primary fluid supply system is configured to supply fluid to a primary load within specified flow rate and pressure ranges. The orifice diverts the first quantity of fluid such that the flow rate to the primary load remains within the flow rate range and the fluid pressure remains within the primary fluid supply system pressure range.

The accumulator accumulates at the least the first quantity of fluid as a fluid charge with positive energy. In one embodiment, the accumulator may accumulate ten times the first quantity of fluid. The apparatus uses a primary fluid supply system to divert, accumulate, and deliver the first quantity of fluid using the fluid flow of the primary fluid supply system wherein delivering the first quantity directly from the primary fluid supply system would disrupt the primary fluid supply system by decreasing fluid flow rate below the flow rate range and the fluid pressure below the pressure range.

A system of the present invention is also presented to intermittently deliver fluid. The system may be embodied in a catalytic converter dosing system. In particular, the system, in one embodiment, includes a primary fluid supply system, an injector, an orifice, and an accumulator.

The primary fluid supply system supplies a fluid to a primary load. The primary fluid supply system must supply the fluid to the primary load within flow rate and pressure ranges. If the fluid pressure drops below the pressure range, the function of the primary load may be impaired. In addition, if the flow rate of fluid to the primary load drops below the flow rate range, the function of the primary load may also be impaired. In one embodiment, the primary fluid supply system includes a fluid store, a filter, a pump, and a regulator.

The injector intermittently delivers a first quantity of fluid over a first time interval. The first quantity of fluid is sufficient to drop the fluid pressure of the primary fluid supply system below the pressure range. However, rather than divert the first quantity of fluid over the first time interval, the orifice diverts the first quantity of fluid from the primary fluid supply system over a second time interval. In addition, the accumulator accumulates at the least the first quantity of fluid as a fluid charge with positive energy. Thus the injector v), may deliver the first quantity of fluid without reducing primary fluid supply system pressure below the pressure range or the flow rate to the primary load below the flow rate range. The system intermittently delivers the fluid using the primary fluid supply system without either impairing the primary fluid supply system or the expense of a separate fluid supply system.

A method of the present invention is also presented for intermittently delivering fluid. The method in the disclosed embodiments substantially includes the steps necessary to carry out the functions presented above with respect to the operation of the described apparatus and system. In one embodiment, the method includes intermittently delivering a first quantity of fluid, diverting the first quantity of fluid, and accumulating at least the first quantity of fluid.

An injector intermittently delivers a first quantity of fluid over a first time interval. An orifice diverts the first quantity of fluid from a primary fluid supply system over a second time interval without decreasing the fluid flow to a primary load below a flow rate range or the fluid pressure of the primary fluid supply system below a pressure range. An accumulator accumulates at the least the first quantity of fluid as a fluid charge with positive energy.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention intermittently delivers a first quantity of fluid diverted from a primary fluid supply system wherein the diversion does not impair the primary fluid supply system although the first quantity of fluid may be sufficient to impair the primary fluid supply system. In addition, the present invention precisely measures the flow rate of the delivered fluid while efficiently cooling an injector. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
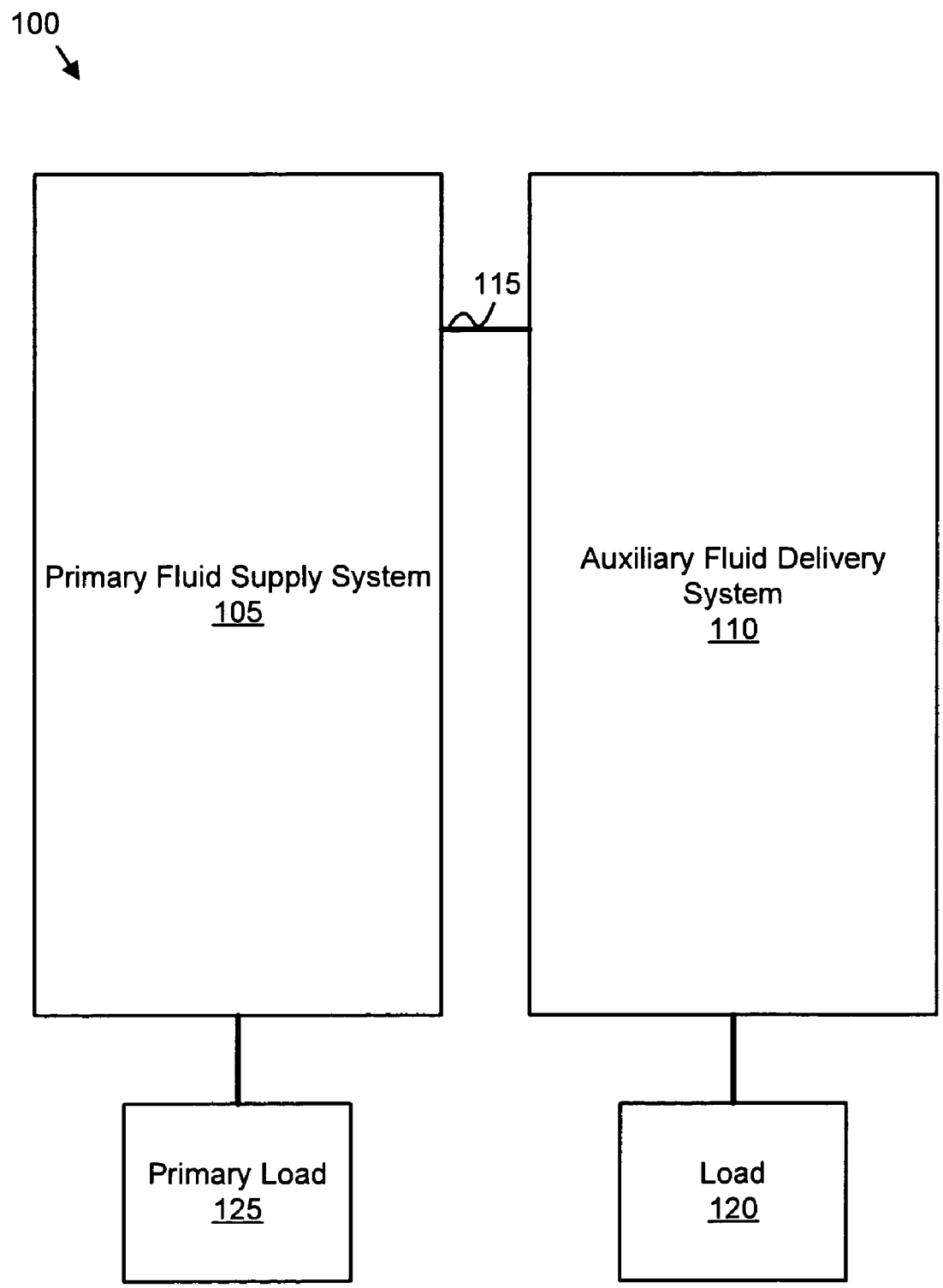
FIG. 1 is a schematic block diagram illustrating one embodiment of primary and auxiliary fluid supply systems of the present invention.

FIG. 1 is a schematic block diagram illustrating one embodiment of primary and auxiliary fluid supply systems 100 of the present invention. The systems 100 include a primary fluid supply system 105 and an auxiliary fluid delivery system 110.

The primary fluid supply system 105 is configured to supply fluid to a primary load 125 within flow rate and pressure ranges. The flow rate and pressure ranges include respectively upper and lower pressure range bounds. The primary fluid supply system 105 may include one or more fluid stores, filters, pumps, and regulators as are well known to those skilled in the art to supply the fluid within the pressure range. If the fluid delivery rate or pressure of the primary fluid supply system drops below the specified ranges, the operation of the primary load 125 may be impaired. In one embodiment, the primary fluid supply system 105 is a fuel supply system for an internal combustion engine primary load 125. If the fuel pressure of the fuel supply system drops below the pressure range, the fuel supplied to the internal combustion engine may decrease, resulting in diminished engine performance. In addition, if the fuel flow rate to the engine drops below the flow rate range, the engine performance is also diminished.

The auxiliary fluid delivery system 110 is configured to intermittently deliver a first quantity of the fluid to a load 120 over a first time interval. The auxiliary fluid delivery system 110 diverts fluid from the primary fluid supply system 105 through a diversion line 115 for delivery to the load 120. The fluid flow of the first quantity of fluid over the first time interval is sufficiently large to reduce the fluid flow rate to the primary load 125 below the flow rate range and the pressure of the primary fluid supply system 105 below the pressure range.

In the past, the auxiliary fluid delivery supply 110 would comprise one or more fluid stores, filters, pumps, and regulators to deliver the fluid so as to eliminate the need for the diversion line 115 and therefore not interrupt the supply of fluid to the primary load 125. Unfortunately, the storage tanks, filters, pumps, regulators, and the like are costly, and increase the assembly and maintenance complexity of the overall systems 100.

The auxiliary fluid delivery system 110 of the present invention diverts the first quantity of fluid from the primary fluid supply system 105 over a second time interval and accumulates at least the first quantity of fluid with a positive energy such that the fluid pressure of the primary fluid supply system 110 remains within the pressure range and the fluid flow rate to the primary load 125 remains within the flow rate range. The auxiliary fluid supply system 110 further delivers the accumulated first quantity of fluid over the first time interval such that the fluid pressure of the primary fluid supply system 110 does not drop below the pressure range or the flow rate to the primary load 125 does not drop below the flow rate range. The auxiliary fluid delivery system 110 synergistically employs the fluid supply capabilities of the primary fluid supply system 105 to deliver the first quantity of fluid, reducing the cost of the auxiliary fluid delivery system 110 without impairing the main function of the primary fluid supply system 105 of supplying the fluid to the primary load 125.

Figure 2:
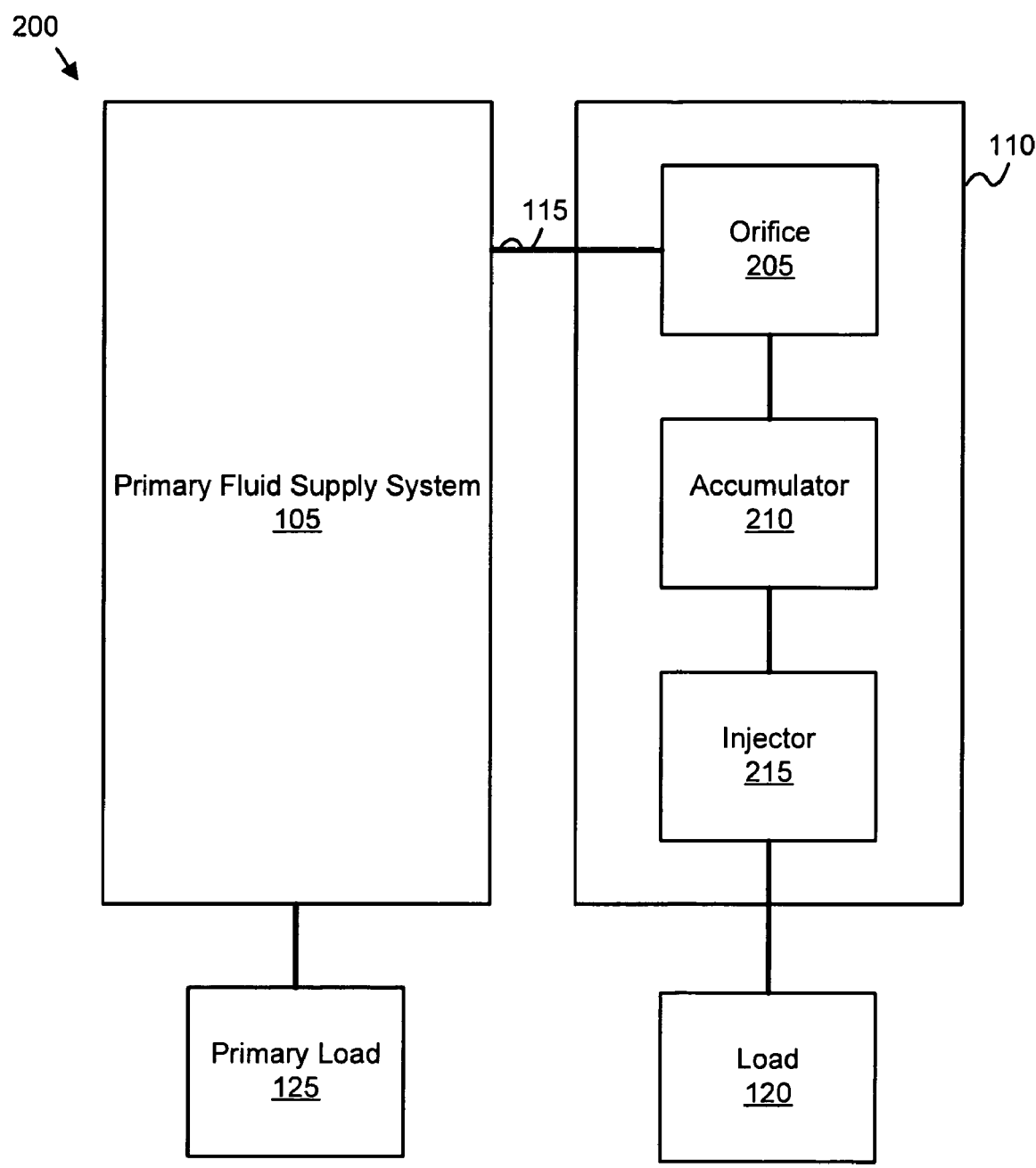
FIG. 2 is a schematic block diagram illustrating one embodiment of an auxiliary fluid supply system of the present invention.

FIG. 2 is a schematic block diagram illustrating one embodiment of an auxiliary fluid supply system 200 of the present invention. The primary fluid supply system 105, primary load 125, diversion line 115, and load 120 of FIG. 1 are depicted with an auxiliary fluid delivery system 110 comprising an orifice 205, an accumulator 210, and an injector 215.

The injector 215 intermittently delivers a first quantity of fluid over a first time interval to the load 120. The orifice 205 diverts the first quantity of fluid from the primary fluid supply system 105 through the diversion line 115. The orifice 205 is sized so that the first quantity of fluid is diverted from the fluid flow of the primary fluid supply system 105 within the pressure range over a second time interval. The orifice 205 is further sized so that fluid pressure of the primary fluid supply system 105 does not drop below the pressure range while the injector 215 delivers the first quantity of fluid over the first time interval. In addition, the flow rate to the primary load 125 remains within the flow rate range.

The accumulator 210 accumulates at least the first quantity of fluid as a fluid charge with positive energy. In addition, the accumulator 210 employs the fluid pressure of primary fluid supply system 105 to accumulate the fluid charge. The accumulator 210 may be configured as a reservoir with a flexible gas-charged diaphragm. The diaphragm may deform in response to the positive pressure of the fluid, increasing the pressure of the diaphragm gas as is well known to those skilled in the art. Accumulating the fluid charge in the accumulator 210 is thus analogous to compressing a fluid spring. The accumulator 210 may release the fluid charge as the pressure, of the fluid diverted to the accumulator 210 drops.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Figure 3:
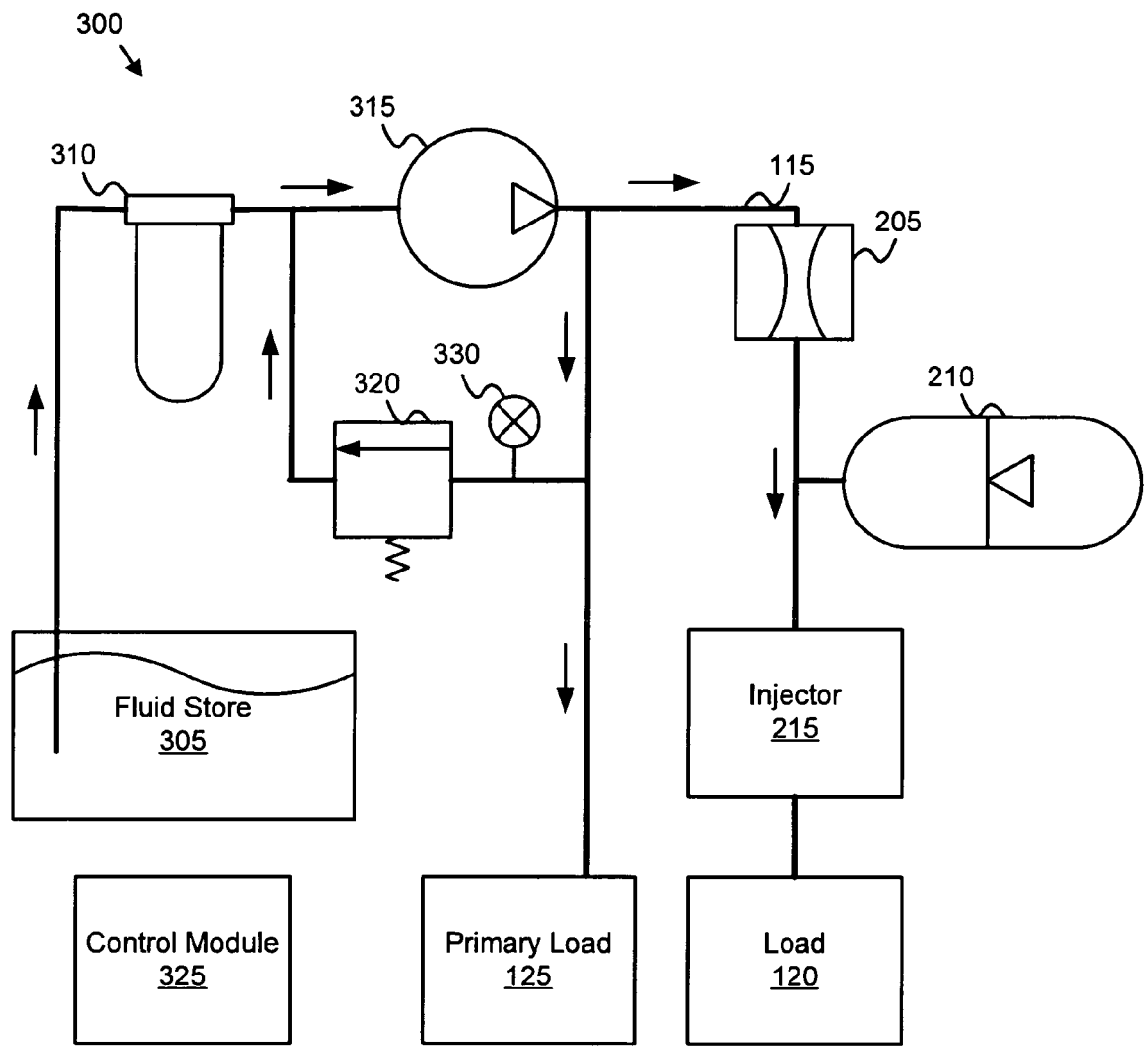
FIG. 3 is a schematic block diagram illustrating one embodiment of a fluid supply system of the present invention.

FIG. 3 is a schematic block diagram illustrating one embodiment of a fluid supply system 300 of the present invention. As depicted, the system 300 includes a fluid store 305, a filter 310, a pump 315, a regulator 320, a control module 325, a pressure sensor 330, a primary load 125, a diversion line 115, an orifice 205, an accumulator 210, an injector 215, and a load 120. In one embodiment, the fluid store 305, filter 310, pump 315, regulator 320, pressure sensor 330, and control module 325 comprise the primary fluid supply system 105 of FIGS. 1 and 2. The orifice 205, accumulator 210, and injector 215 may comprise the auxiliary fluid delivery system of FIGS. 1 and 2.

The fluid store 305 stores a fluid, and may be a storage tank or the like. The pump 315 draws fluid from the fluid store 305 and supplies the fluid to the primary load 125 at a fluid flow rate and pressure at least equivalent to lower flow rate and pressure range bounds. The fluid filter 310 separates impurities from the fluid drawn from the fluid store 305. The regulator 320 diverts excess fluid to prevent the fluid flow rate supplied to the primary load 125 from exceeding an upper flow rate range bound or the fluid pressure from exceeding an upper fluid pressure range bound. The upper and lower fluid flow rate and pressure bounds comprise respective flow rate and pressure ranges. The system 300 must supply the fluid to the primary load 125 within the flow rate and pressure ranges to prevent impairment of the primary load's 125 operation.

The control module 325 may be in communication with the pump 315, the pressure sensor 330, and the injector. In one embodiment, the control module 325 receives pressure data from the pressure sensor 330 and issues commands to the pump 315 and the injector 215. The control module 325 may be primarily configured to regulate the supply of fluid to the primary load 125, but may also regulate the delivery of fluid to the load 120 using spare resources such as spare instruction memory and computing cycles. In one embodiment, the injector 215 intermittently delivers the first quantity of fluid over the first time interval in response to a command from the control module 325.

Figure 4:
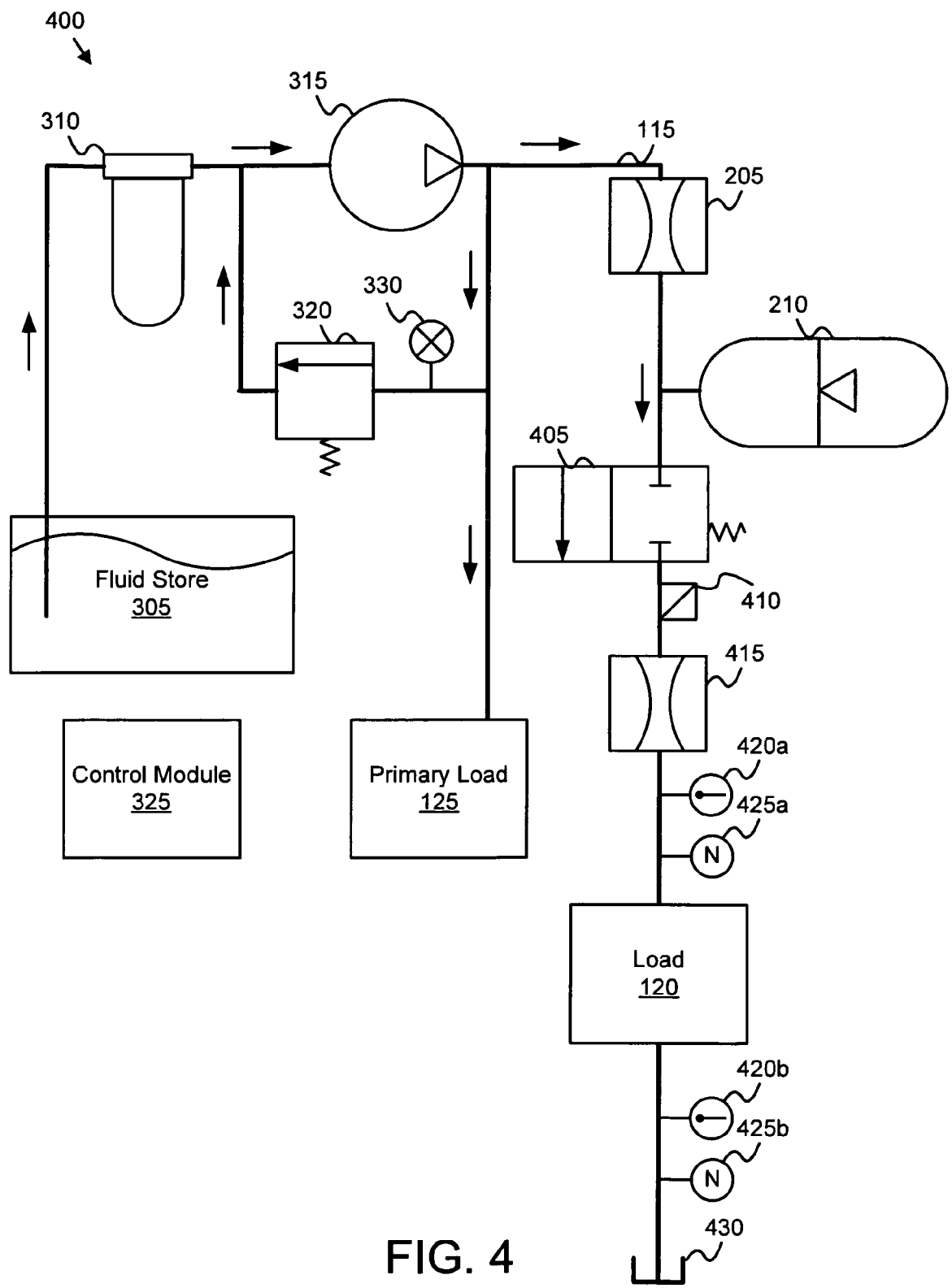
FIG. 4 is a schematic block diagram illustrating one embodiment of an alternate fluid supply system of the present invention.

FIG. 4 is a schematic block diagram illustrating one embodiment of an alternate fluid supply system 400 of the present invention. The system 400 comprises the elements of the system 300 of FIG. 3. In one embodiment, the system 400 is configured to deliver a reducant. In a certain embodiment the reducant is diesel fuel.

For example, the primary load 125 may be the fuel system of a diesel engine. The pump 315 and regulator 320 may deliver diesel fuel to the diesel engine within flow rate and pressure ranges required for operation of the diesel engine. In one embodiment, the load 120 may be an exhaust gas emission control system such as a catalytic converter. The system 400 may deliver a reducant such as diesel fuel to the catalytic converter to regenerate the catalytic converter.

In addition to the elements of FIG. 3, the system 400 includes a valve 405, a flow sensor 410, a nozzle 415, one or more temperature sensors 420, one or more nitrogen oxide ("NOX") sensors 425, and a drain 430. In one embodiment, the flow sensor 410 and temperature sensor 420 are virtual sensors creating estimated flow and temperature measurements as functions of mathematical models using other sensed engine conditions as inputs. For example, the temperature sensor 420 may calculate a temperature measurement as a function of fuel injected to an engine and the measured engine temperature. The drain 430 may be the ambient surroundings of the system 400. For example, the drain 430 may be the atmosphere.

The valve 405 opens to allow fluid to flow from the accumulator 210 and through the orifice 205 to the nozzle 415. The nozzle 415 may atomize and disperse the fluid into the load 120. For example, if the load 120 is a catalytic converter, the nozzle 415 disperses the fluid into the exhaust gas entering the catalytic converter.

In one embodiment, the control module 325 modifies the first quantity of fluid delivered to the load in response to data from the temperature sensor 420 and the NOX sensor 425. For example, the control module 325 may increase the fluid delivered to the load 120 for low temperatures and decrease the fluid delivered to the load for high temperatures. The control module 325 may further increase the fluid delivered to the load 120 if NOX sensor 425 detects higher concentrations of NOX.

The flow sensor 410 allows the control module 325 to precisely regulate the first quantity of fluid delivered by the nozzle 415 to the load 120 by controlling the first time interval wherein the valve 405 is open and allows the fluid to flow. For example, the control module 325 may increase the first time interval wherein the valve 405 is open if the flow sensor 410 communicates that less than the first quantity of fluid was delivered during a previous cycle. The flow sensor 410 allows the control module 325 to control the deliver of fluid as a closed loop system, increasing the efficiency of fluid delivery.

Figure 5A:
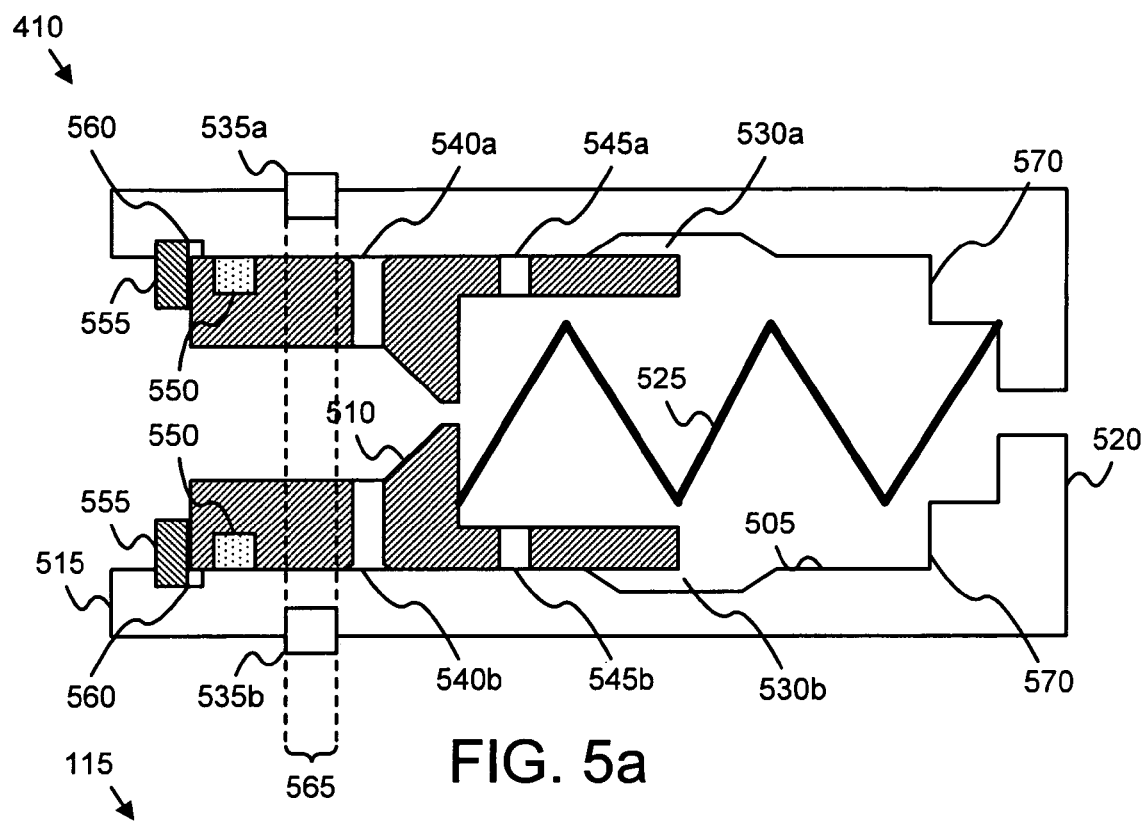
FIG. 5a,b are cross sectional drawings illustrating one embodiment of a flow sensor of FIG. 4.

FIG. 5a,b are cross sectional drawings illustrating one embodiment of a flow sensor 410 of the present invention. The flow sensor 410 may be the flow sensor 410 of FIG. 4. As depicted, the flow sensor 410 includes a cavity 505 configured with a proximal 515 and distal end 520, a plunger 510, and one or more sensor modules 535. In addition the flow sensor 410 may include a bias member 525, one or more channels 530, one or more proximal passages 540, one or more distal passages 545, one or more sensor targets 550, a stop 570, a retainer 555, and a groove 560.

The cavity 505 is configured to transport fluid from the cavity proximal end 515 through the cavity distal end 520. The plunger 510 may traverse axially within the cavity 505. The plunger 510 prevents the flow of fluid around the plunger 510 and through the cavity 505.

In one embodiment, the bias member 525 biases the plunger 510 toward the proximal end 515 as depicted in FIG. 5a. The bias member 525 may be a spring. In a certain embodiment, retainer 555 arrests the plunger 510 as the plunger is biased toward the proximal end 515. The retainer 555 may reside with the groove 560.

The flow of fluid through the cavity 505 may motivate the plunger 510 toward the distal end 520 such that the plunger 510 traverses a translation distance 565 within the cavity 505. In the depicted embodiment, the translation distance 565 is the width of the sensor module 535, although the translation distance 565 may be any distance within the cavity 505. The sensor module 535 detects the plunger 510 traversing the translation distance 565. In one embodiment, the sensor module 535 is a non-impacting proximity sensor. The sensor module 535 may detect the sensor target 550. The sensor target 550 may be a magnet or material with unique magnetic properties or other properties suitable for non-contacting proximity sensing.

The plunger 510 traverses a volume of the cavity 505 while traversing the translation distance 565. In one embodiment, a control module 325 such as the control module 325 of FIGS. 3 and 4 may calculate the fluid flow rate f through the flow sensor 410 as the volume V of the cavity 505 over the translation distance 565 divided by the time interval T for the plunger 510 to traverse the translation distance 565, as shown in Equation 1.

$$f = \frac{V}{T} \qquad \text{Equation 1}$$

Figure 5B:
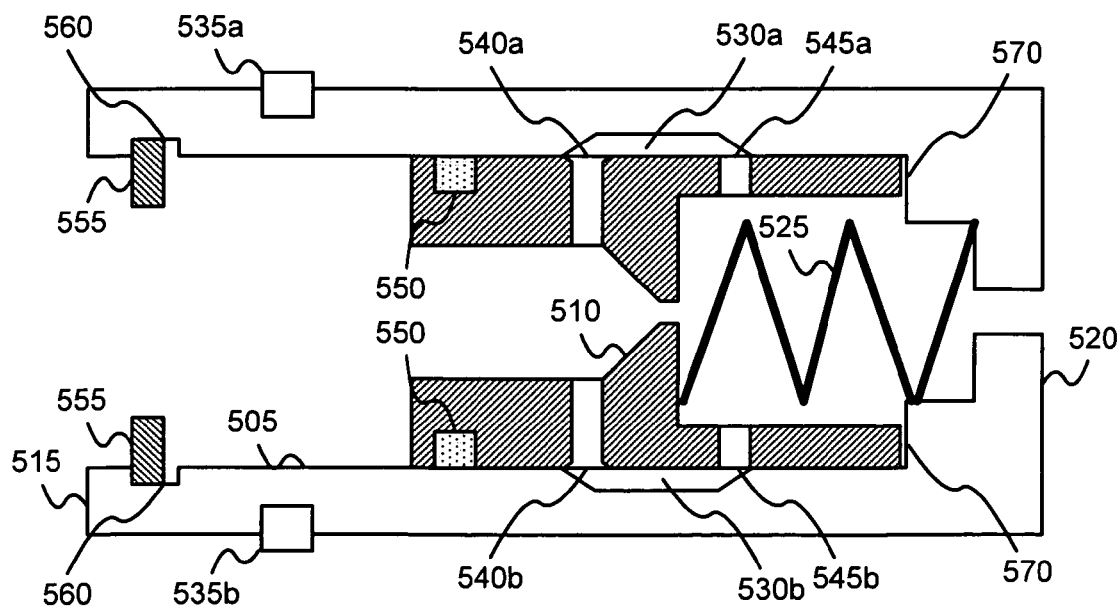

The flow of the fluid through the cavity 505 may motivate the plunger 510 toward the distal end 520 such that the plunger 510 is arrested by the stop 570 as depicted in FIG. 5b. With the plunger 510 in the position of FIG. 5b, fluid may flow through the proximal passage 540, through the channel 530, and through the distal passage 545. Thus fluid may flow through the cavity 505.

Figure 6A:
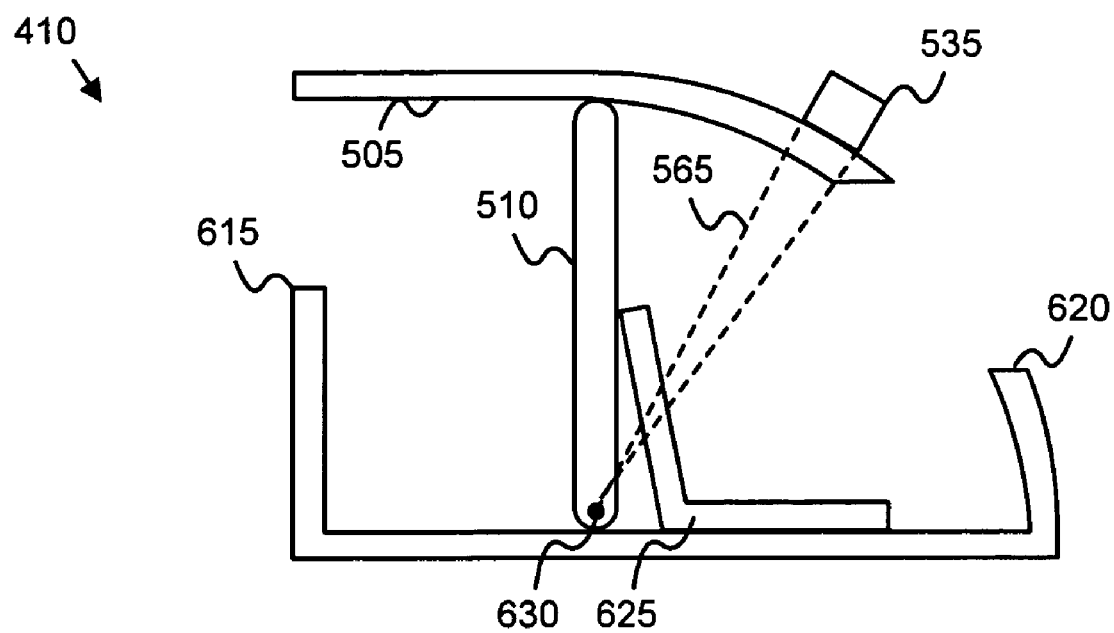
FIG. 6a, b are schematic drawings illustrating one embodiment of an alternate flow sensor of the present invention.

FIG. 6a, b are schematic drawings illustrating one embodiment of an alternate flow sensor 410 of the present invention. The flow sensor 410 may be the flow sensor 410 of FIG. 4. As depicted, the flow sensor 410 includes a cavity 505 configured with a proximal 615 and distal end 620, a plunger 510, and one or more sensor modules 535. In addition the flow sensor 410 may include a bias member 625, and a pin 630.

The cavity 505 is configured to transport fluid from the cavity proximal end 615 through the cavity distal end 620. The plunger 510 may traverse the cavity 505 radially, rotating around the pin 630. The plunger 510 prevents the flow of fluid around the plunger 510 and through the cavity 505.

In one embodiment, the bias member 625 biases the plunger 510 toward the proximal end 615 as depicted in FIG. 6a. The bias member 625 may be a torsion spring. The flow of fluid through the cavity 505 may motivate the plunger 510 toward the distal end 620 against the force of the bias member 625 such that the plunger 510 traverses a translation distance 565 within the cavity 505. The sensor module 535 detects the plunger 510 traversing the translation distance 565. The plunger 510 traverses a volume of the cavity 505 while traversing the translation distance 565. In one embodiment, a control module 325 such as the control module 325 of FIGS. 3 and 4 may calculate the fluid flow rate f through the flow sensor 410 using Equation 1, where V is the volume of the cavity 505 over the translation distance 565 and T is the time interval for the plunger 510 to traverse the translation distance 565.

Figure 7:
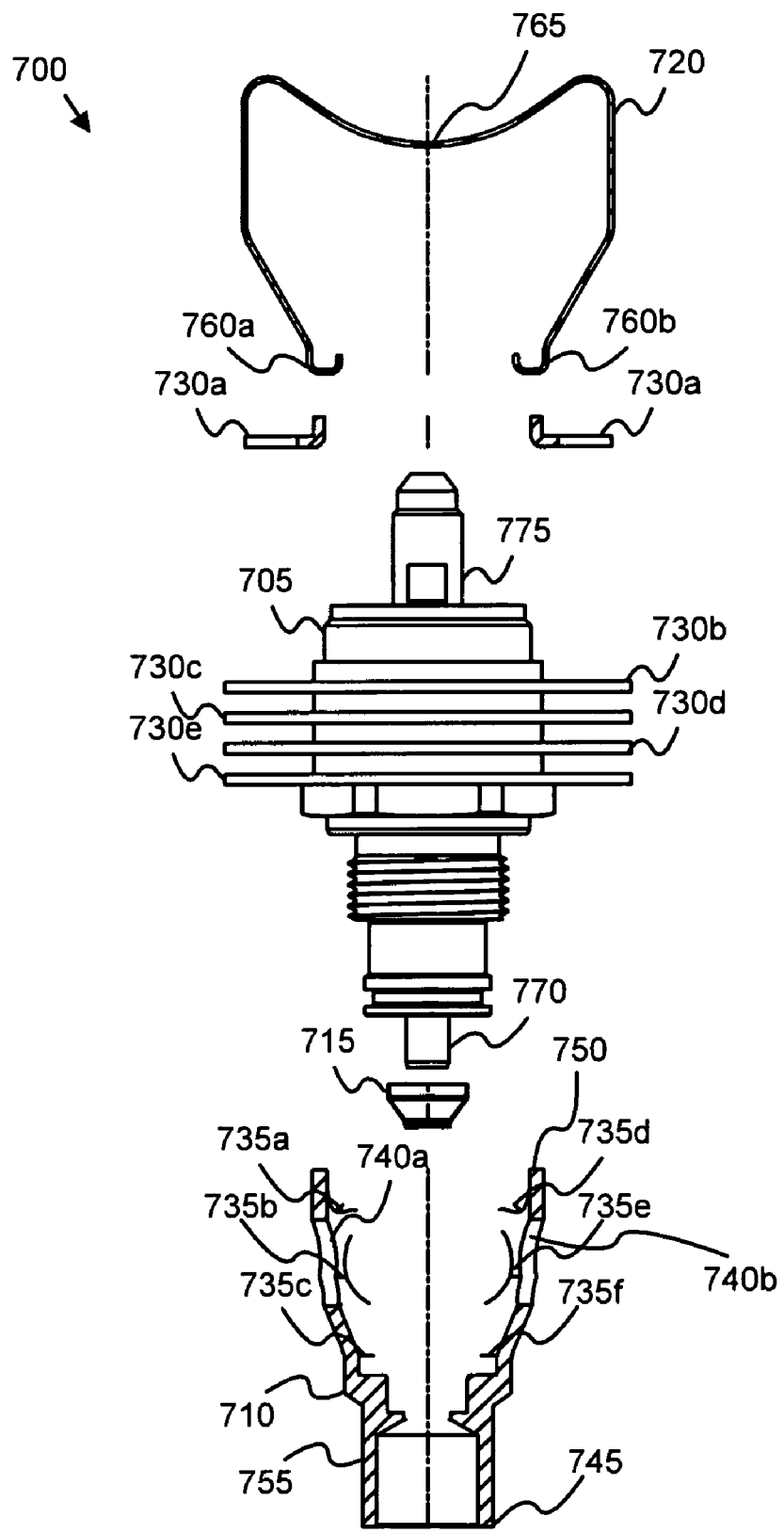
FIG. 7 is a exploded cut-away drawing illustrating one embodiment of injector and mount components of the present invention.

FIG. 7 is an exploded cut-away drawing illustrating one embodiment of injector and mount components 700 of the present invention. The components 700 as depicted include an injector 705, a mounting member 710, a seal 715, a mounting spring 720, and one or more cooling fins 730.

The injector 705 is configured with a proximal end 775 and a distal end 770. In addition, the injector 705 may be configured with a short internal thermal path from the injector distal end 770 to the injector proximal end 775. In one embodiment, the injector 705 is further configured with the internal heat path having a large cross-sectional area and high conductivity. The short thermal path, large cross-sectional area, and high thermal conductivity increase the conduction of heat from the injector distal end 770 to the injector proximal end 775.

The cooling fins 730 are configured to be pressed over the injector 705. In one embodiment, the cooling fins 730 are configured to contact the injector 705, creating a thermal path to carry heat from the injector 705. The cooling fins 730 may comprise one or more materials with high thermal conductivity and may be stamped. In addition, the cooling fins 730 may be configured to present a large surface area to the ambient environment. The first cooling fin 730*a* is depicted prior to being pressed over the injector 705 while the second, third, fourth, and fifth cooling fins 70*b-e* are depicted pressed over the injector 705.

The mounting member 710 includes a proximal end 750 and a distal end 745. The distal end 745 comprises a standoff 755. In one embodiment, the mounting member is configured with a plurality of fingers 735. The fingers 735 position and hold the con injector 705 within the mounting member 710. Each finger 735 is configured with a long thermal path and a minimal cross-sectional area to minimize heat conduction from the mounting member 710 to the injector 705. In addition, each finger 735 may comprise one or more materials with low thermal conductance. The mounting member 710 may also comprise a plurality of perforations 740.

The seal 715 is comprised of a thin insulator. In one embodiment, the seal 715 is further comprised of a resilient insulating material. The mounting spring 720 may be configured with a proximal end 765 and one or more distal ends 760. In addition, the mounting spring 720 may have with a long thermal path and small cross-sectional area from the mounting spring distal ends 760 to the mounting spring proximal end 765. In one embodiment, the mounting spring 720 is comprised of one or more materials with low thermal conductivity.

Figure 8:
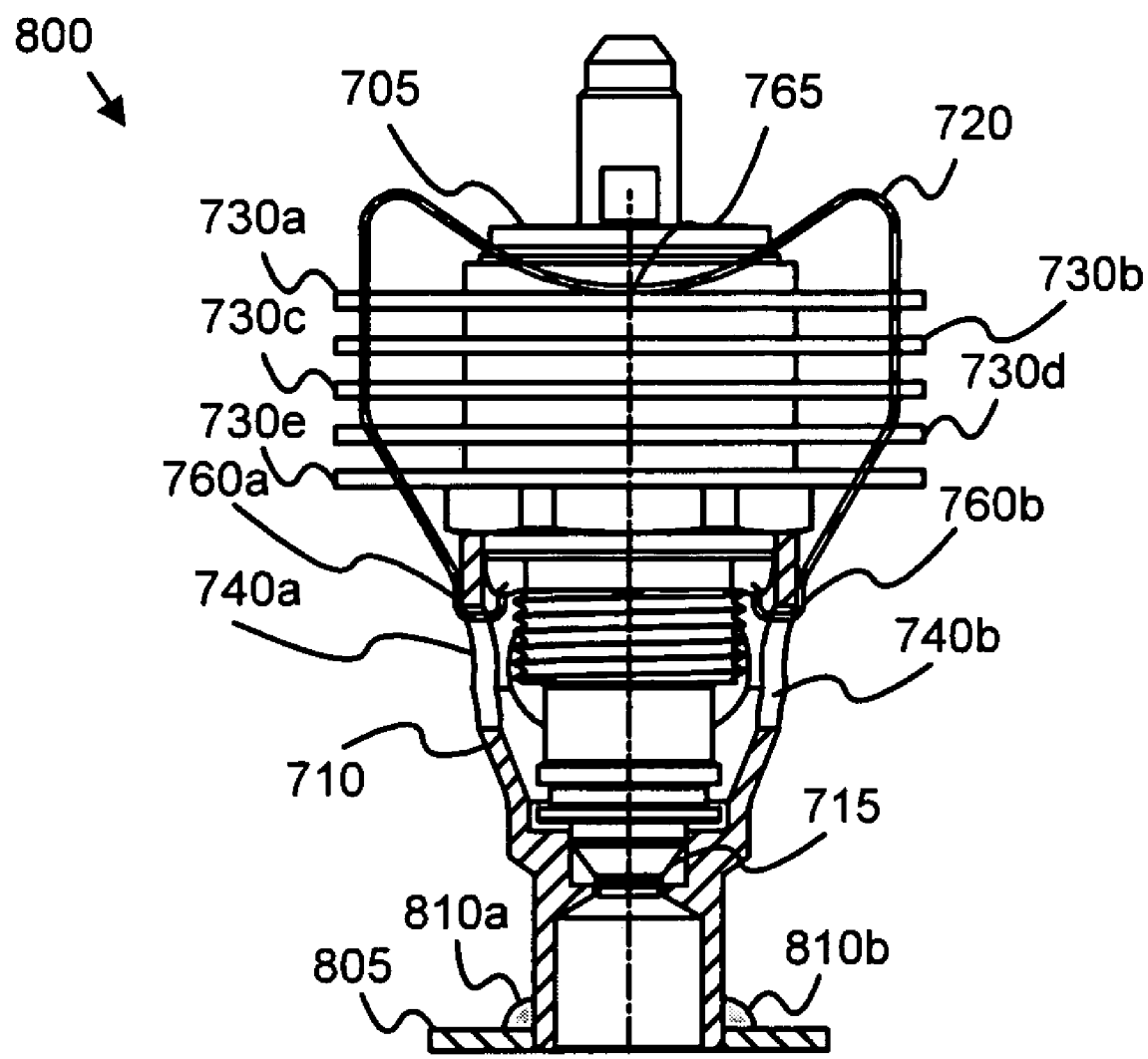
FIG. 8 is a cut-away drawing illustrating one embodiment of an injector and mount of the present invention.

FIG. 8 is a cut-away drawing illustrating one embodiment of an injector and mount 800 comprising the assembled components 700 of FIG. 7. The standoff 755 of the mounting member 710 connects with a load 805. The load may be the load 120 of FIGS. 1-4. In one embodiment, the load 120 is an exhaust line containing exhaust gas at a high temperature. The mounting member 710 is recessed from the load 805 and the high-temperature environment of the load 805 by the standoff 755. In one embodiment, the standoff 755 is connected to the load 805 by a weld 810. In an alternate embodiment, the standoff 755 is connected to the load 805 by a gasket.

The mounting member 710 is configured with a long thermal path with low thermal conductivity from the load 120 to the injector 705 to minimize the conduction of heat from the load 120 to the injector 705. The perforations 740 of the mounting member 710 increase the effective length of the mounting member 710 thermal path. In addition, the perforations allow air to circulate inside the mounting member 710, cooling the mounting member 710 and the injector 705.

The mounting member 710 fingers 735 position and hold the injector 705 within the mounting member 710. The fingers 735 contact the injector 705 over a minimal area to reduce heat conduction from the mounting member 710 to the injector 705. The long thermal path of the fingers 735 further decrease heat conduction from the mounting member 710 to the injector 705.

The seal 715 may prevent exhaust gas from escaping through the mounting member 710 while providing a high thermal resistance heat transfer path between the mounting member 710 and the injector 705. In one embodiment, the seal 715 contacts the injector 705 over a small area to minimize heat conduction from the mounting member 710 and the load 805 to the injector 705.

The mounting spring 720 is configured to secure the injector 705 to the mounting member 710. In the depicted embodiment, the mounting spring distal end 760 contacts the mounting member 710 to secure the mounting spring 720 to the mounting member 710. The mounting spring 720 may bias the injector 705 to the mounting member 710 while only contacting the injector 705 at the mounting spring proximal end 765. Thus the mounting spring 720 comprises a long thermal path from the mounting member 710 to the injector 705 to minimize the heat transfer through the mounting spring 720.

The injector 705 includes a solenoid (not shown). When energized, the solenoid allows fluid to flow through the injector 705. In one embodiment, the fluid has high thermal conductivity. The fluid may conduct heat from the interior distal 770 end of the injector to the interior proximate end 775 to facilitate heat rejection via cooling fins 730. In addition, the solenoid only generates heat when energized and allowing fluid to flow. Thus the fluid may cool the solenoid as the solenoid generates heat.

The cooling fins 730 conduct heat from the injector 705. In one embodiment, the cooling fins 730 are oriented to increase the convective heat exchange with the ambient environment. For example, the cooling fins 730 may be oriented vertically such that air heated by cooling fins 730 rises, creating a flow of air across the cooling fins 730 that convectively cool the cooling fins 730.

The injector 705, mounting member 710, and seal 715 minimize heat transfer from the load 805 to the injector 705 while maximizing heat transfer from the injector 705. In one embodiment, the injector 705, mounting member 710, and seal 715 enable the injector 705 to be passively cooled such as by the ambient environment.

Figure 6B:
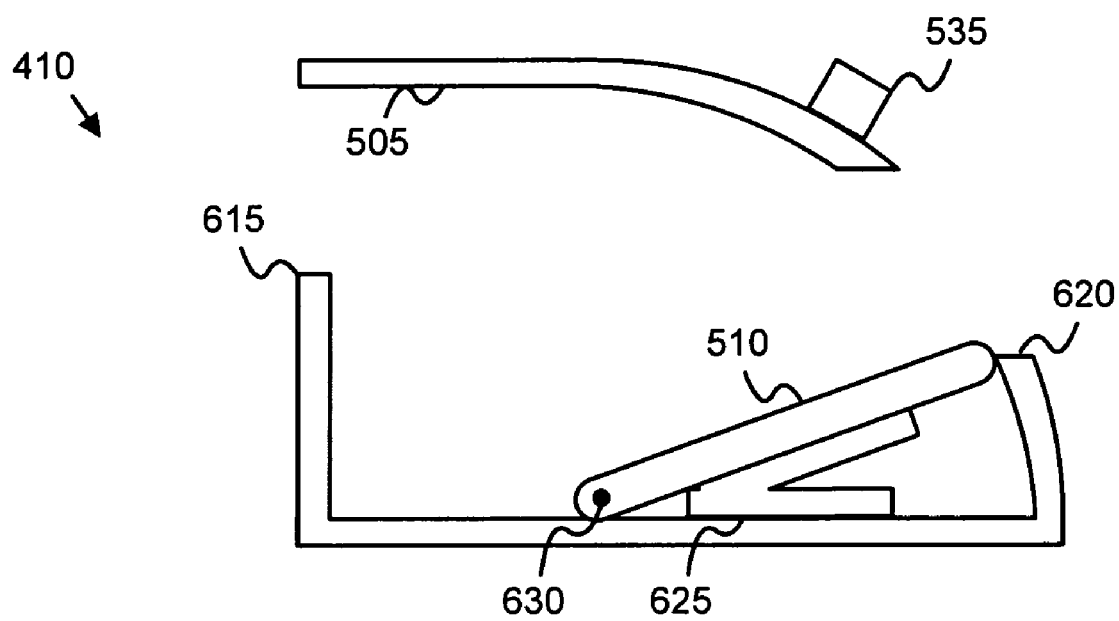
Figure 9:
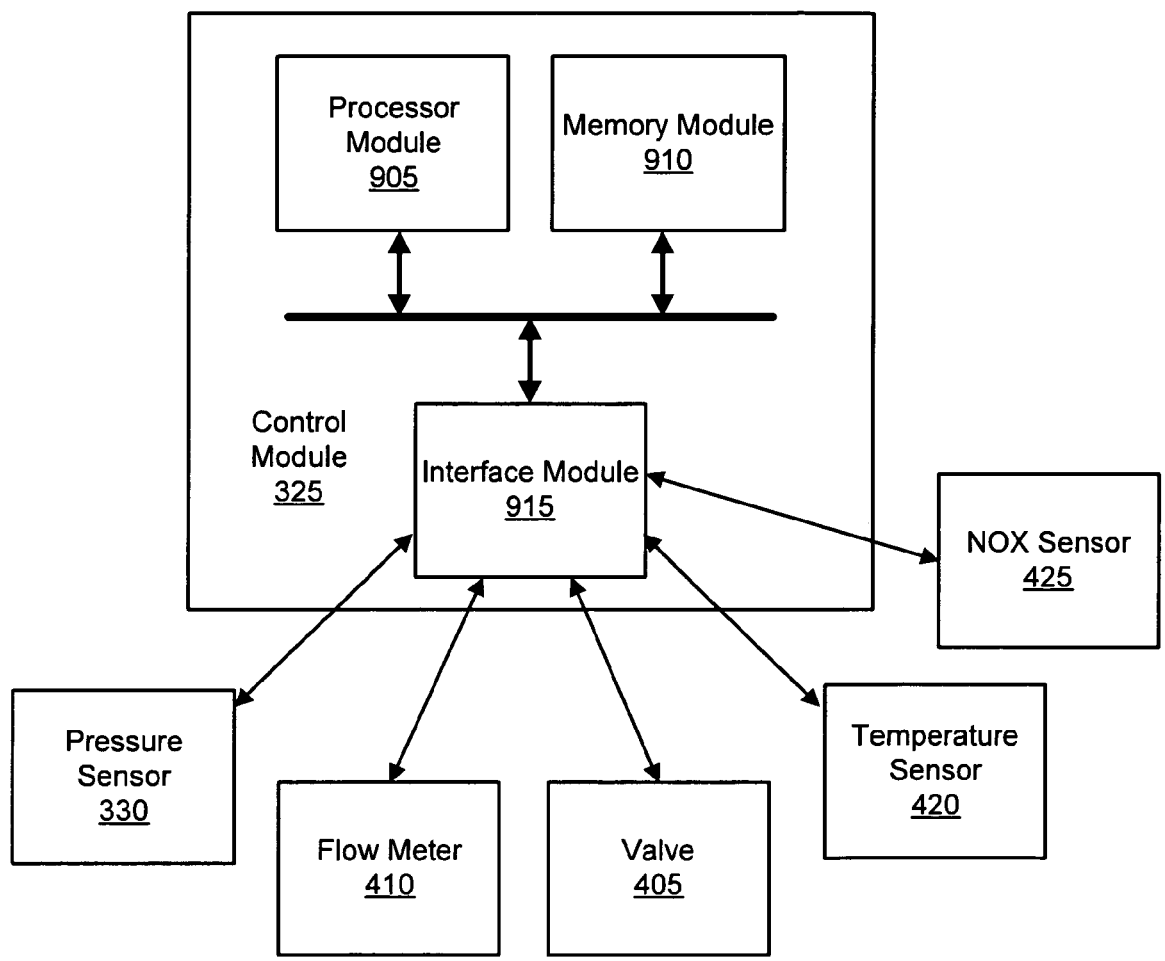
FIG. 9 is a schematic block diagram illustrating one embodiment of a control module of the present invention.

FIG. 9 is a schematic block diagram illustrating one embodiment of a control module 325 of the present invention. The control module 325 may be the control module 325 of FIGS. 3 and 4. As depicted, the control module 325 includes a processor module 905, a memory module 910, and an interface module 915. The control module 325 is further depicted in communication with the pressure sensor 330 of FIGS. 3 and 4, the flow sensor 410 of FIGS. 4-6, and the valve 405, temperature sensor 420, and NOX sensor 425 of FIG. 4

The processor module 905, memory module 910, and interface module 915 may be fabricated of semiconductor gates on one or more semiconductor substrates. Each semiconductor substrate may be packaged in one or more semiconductor devices mounted on circuit cards. Connections between the processor module 905, the memory module 910, and the interface module 915 may be through semiconductor metal layers, substrate to substrate wiring, or circuit card traces or wires connecting the semiconductor devices.

The memory module 910 stores software instructions and data comprising one or more software processes. The processor module 905 executes the software instructions and manipulates the data as is well know to those skilled in the art. The processor module 905 communicates with the pressure sensor 330, the flow sensor 410, valve 405, the temperature sensor 420, and the NOX sensor 425 through the interface module 915. The interface module 915 may employ one or more communication channels such as a serial bus or dedicated electrical connections to communicate with the pressure sensor 330, the flow sensor 410, valve 405, the temperature sensor 420, and the NOX sensor 425.

The processor module 905 may be configured to execute one or more software processes that control the primary fluid supply system 105 of FIGS. 1 and 2. In addition, the processor module 905 may execute one or more software processes that control the injector 205 of FIGS. 2 and 3 and the valve 405 of FIG. 4. In one embodiment, the processor module 905 commands the valve 405 to deliver fluid in response to an internal clock and data from the pressure sensor 330, the flow sensor 410, the temperature sensor 420, and the NOX sensor 425.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 10:
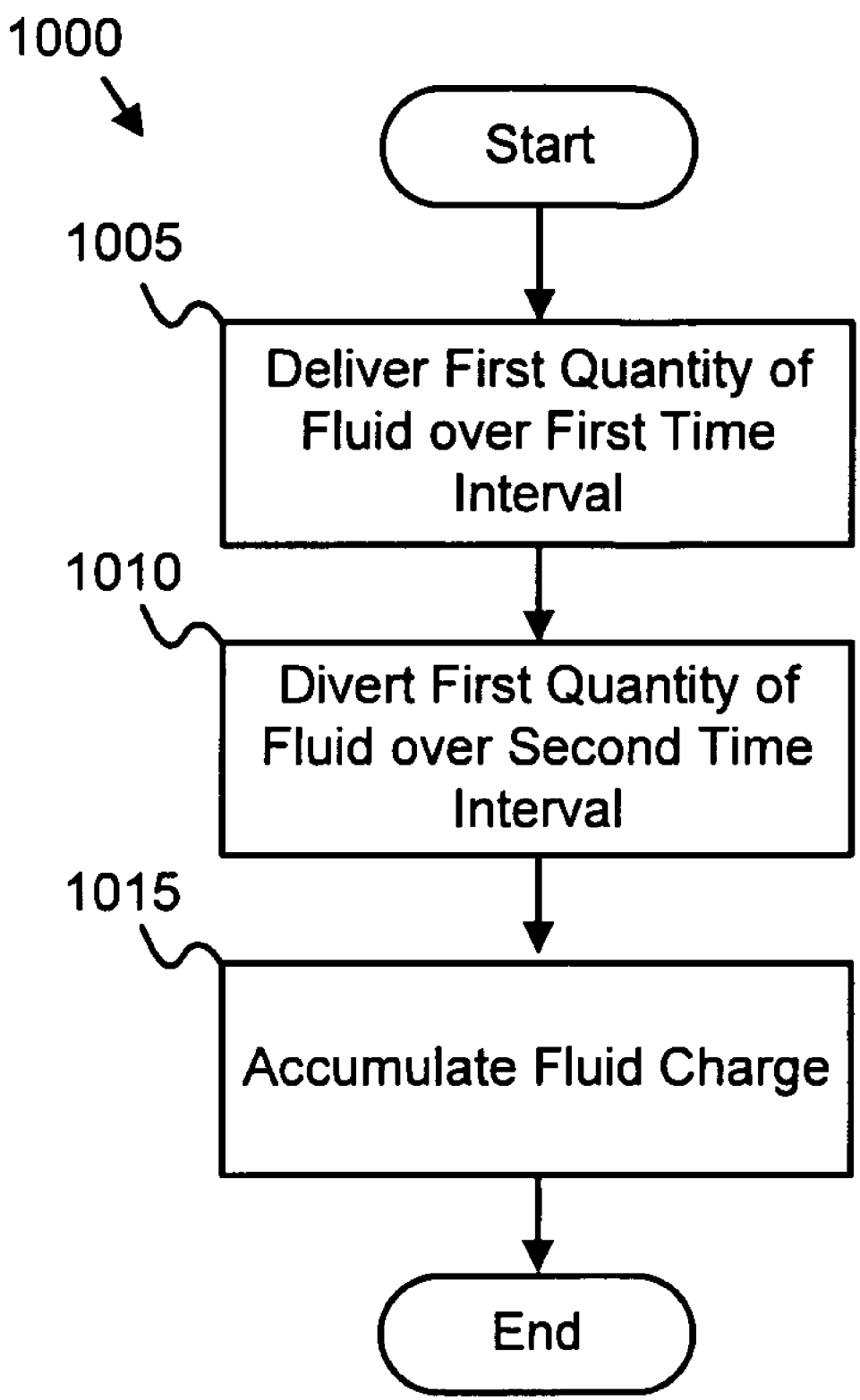
FIG. 10 is a schematic flow chart diagram illustrating one embodiment of an intermittently fluid delivery method of the present invention.

FIG. 10 is a schematic flow chart diagram illustrating one embodiment of an intermittent fluid delivery method 1000 of the present invention. The method 1000 substantially includes the steps necessary to carry out the functions presented above with respect to the operation of the described systems 100, 200, 300, 400 in FIGS. 1-4. The method 1000 begins and an injector 215 such as the injector of FIG. 2 intermittently delivers 1005 a first quantity of fluid over a first time interval. The injector 215 may deliver 1005 the first quantity of fluid to a load 120 such as the load of FIGS. 1-4. In one embodiment, the first time interval is the time interval of a regeneration cycle for a catalytic converter, the first quantity of fluid is the quantity of reductant required to regenerate the catalytic converter, and the load 120 is the catalytic converter.

In one embodiment, a control module 325 such as the control module of FIGS. 3 and 4 commands the injector 215 to deliver 1005 the first quantity of fluid. The control module 325 may command the injector 215 to deliver 1005 the fluid in response to an internal timer. For example, the control module 325 may command the injector 215 to deliver 1005 fluid every twenty-nine seconds (29 s). Alternatively, the control module 325 may command the injector 215 to deliver 1005 the fluid in response to data from the temperature sensor 420 and the NOX sensor 425 of FIG. 4.

An orifice 205 such as the orifice of FIGS. 2-4 diverts 1010 the first quantity of fluid from a primary fluid supply system 105 such as the primary fluid supply system 105 of FIGS. 1 and 2. The primary fluid supply system 105 is configured to supply fluid to a primary load 125 such as the primary load 125 of FIGS. 1-4. In one embodiment, the first quantity of fluid is in the range of zero point one percent to five percent (0.1% -5%) of the fluid supplied by the primary fluid supply system 105. The orifice 205 diverts 1010 the first quantity of fluid over a second time interval. The second time interval may be the time interval between regeneration cycles for a catalytic converter. In one embodiment, the minimum effective area of the orifice A is calculated using Equation 2, where $V_1$ is the volume of the first quantity of fluid, $T_2$ is the second time interval, $\Delta P$ is difference between the maximum and minimum of the pressure range, and $\rho$ is the fluid density.

$$A \geq \frac{V_1}{\int_0^{T_2} \sqrt{\frac{2\Delta P}{\rho}}\, dt} \qquad \text{Equation 2}$$

An accumulator 210 such as the accumulator of FIGS. 2-4 accumulates 1015 at least the first quantity of fluid as a fluid charge with positive energy. In addition, the accumulator 210 accumulates 1015 the first quantity of fluid over the second time interval. In one embodiment, the minimum volume of the accumulator 210 $V_A$ may be calculated by Equation 3, where $V_1$ is the volume of first quantity of fluid, $P_{Min}$ is the lower pressure range bound of the pressure range, $P_{Max}$ is the upper pressure range bound of the pressure range, $P_{MT}$ is accumulator 210 precharge pressure at a maximum temperature, and b is constant. In one embodiment, b is 0.714, $P_{Min}$ is two bar absolute, and $P_{Max}$ is 25 bar absolute.

$$V_A \geq \frac{V_1}{\left(\frac{P_{MT}+1}{P_{Min}+1}\right)^b - \left(\frac{P_{MT}+1}{P_{Max}+1}\right)^b} \qquad \text{Equation 3}$$

The accumulator 210 stores the fluid energy of the primary fluid supply system 105. In one embodiment, the accumulator 210 may employ a gas-charged diaphragm to store the fluid energy. The control module 325 may modify the first time interval in response to changes in the pressure of the gas-charged diaphragm. For example, if the pressure of the gas-charged diaphragm decreases over time, diminishing the fluid flow rate from the accumulator 210 during the first time interval, the control module 325 may increase the first time interval so that the injector 215 delivers 1005 the first quantity of fluid.

The method 1000 synergistically diverts 1010 fluid from the primary fluid supply system 105 for delivery to the load 120 such that one or more components of the primary fluid supply system 105 need not be replicated for delivering the fluid. The area of the orifice 205 and volume of the accumulator 210 of the method 1000 are sized that the fluid is diverted without impairing the supply of fluid to the primary load 125.

Figure 11:
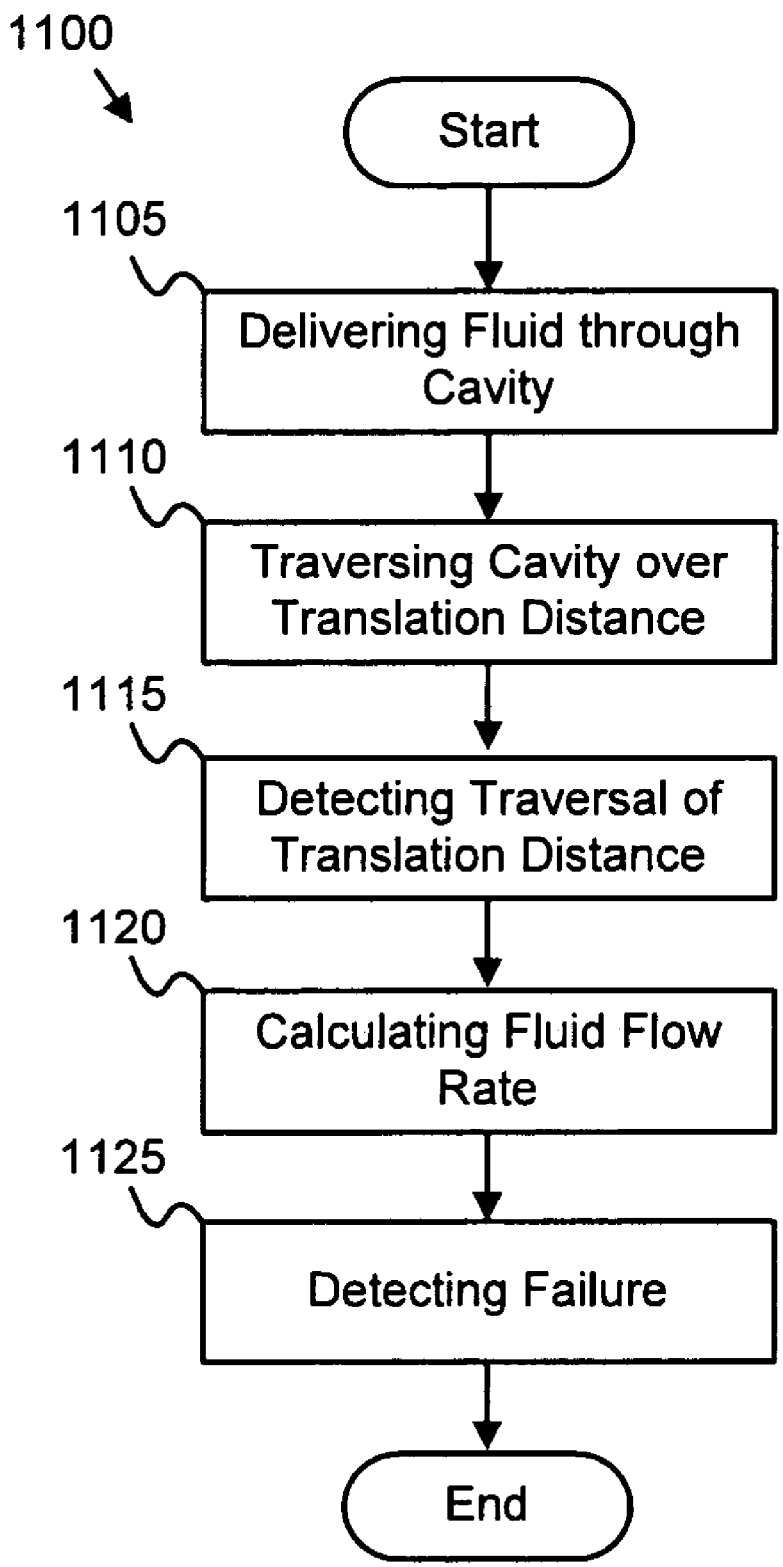
FIG. 11 is a schematic flow chart diagram illustrating one embodiment of a flow sensing method of the present invention.

FIG. 11 is a schematic flow chart diagram illustrating one embodiment of a flow sensing method 1100 of the present invention. The method 1100 substantially includes the steps necessary to carry out the functions presented above with respect to the operation of the described flow sensors 410 in FIGS. 5-6. The method 1100 begins and a cavity 505 delivers 1105 fluid from a cavity proximal end 515 to a cavity distal end 520. A plunger 510 traverses 1110 the cavity 505 over a translation distance 565 in response to the fluid flowing through the cavity 505. A sensor module 535 detects 1115 the traversal of the translation distance 565.

In one embodiment, a control module 325 such as the control module 325 of FIGS. 3 and 4 calculates 1120 a fluid flow rate f as the volume V of the cavity 505 over the translation distance 565 divided by the time interval T for traversing the translation distance 565 as shown in Equation 1. The sensor module 535 may communicate a first pulse to the control module 325 when the plunger 505 begins traversing the translation distance 565 and a second pulse when the plunger 505 completes traversing the translation distance 565. The control module 325 may calculate the time interval T for traversing the translation distance 565 as the interval between the first and second pulse.

In one embodiment, the control module 325 detects 1125 a failure from the sensor module 535. The control module 325 may detect 1125 a failure to deliver fluid if the sensor module 535 does not detect the plunger 510 traversing the translation distance 565. In a certain embodiment, the control module 325 detects 1125 a plugged nozzle 415 such as the nozzle 415 of FIG. 4. The method 1200 senses quantitative and qualitative intermittent fluid flow, and may allow fluid flow to be precisely controlled.

Figure 12:
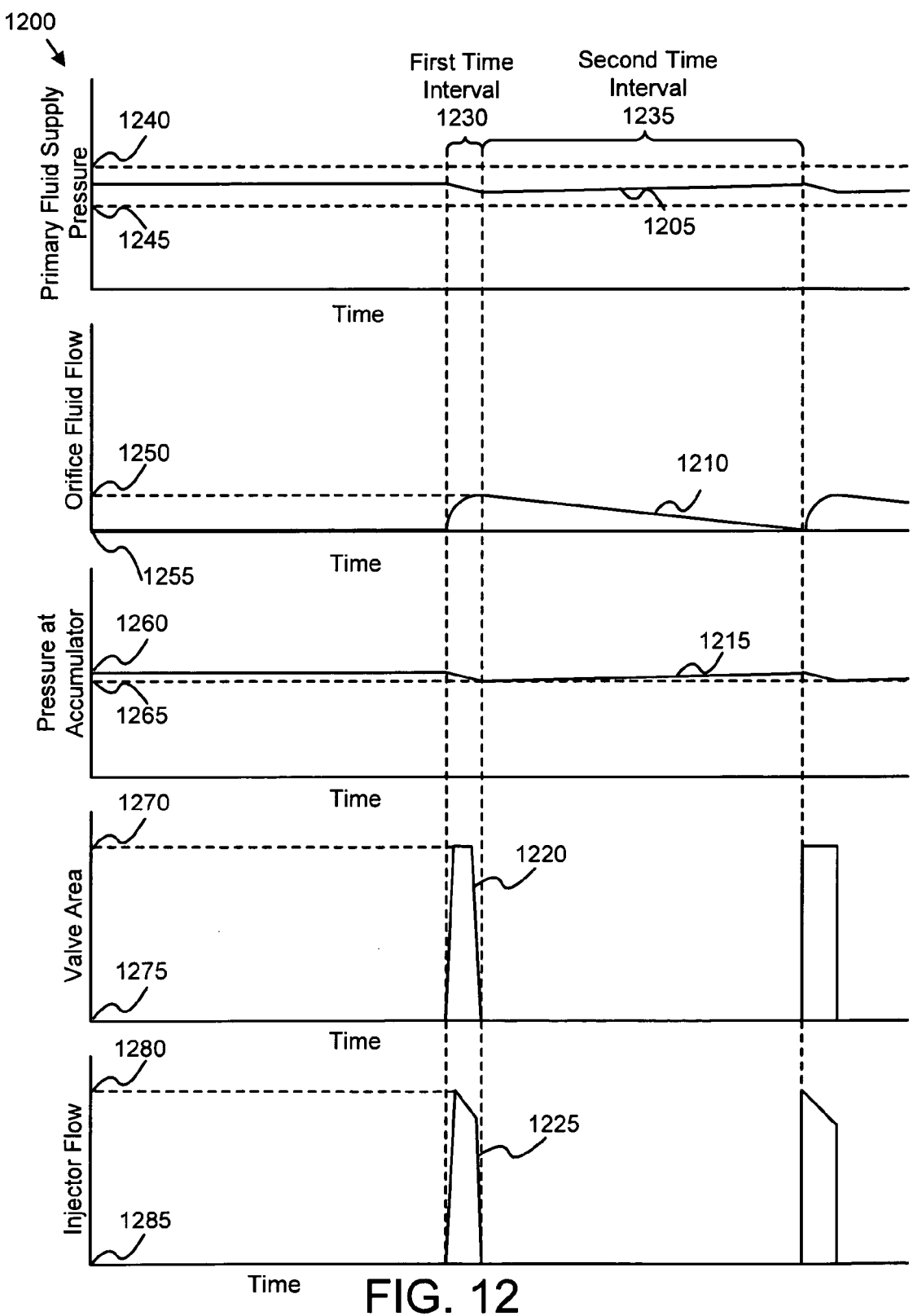
FIG. 12 is a plot of illustrating one embodiment of intermittent fluid delivery timing of the present invention.

FIG. 12 is a plurality of graphs of illustrating one embodiment of an intermittent fluid delivery timing plot 1200 of the present invention. The plots 1200 illustrate primary fluid supply system pressure 1205 for a primary fluid supply system 105 such as the primary fluid supply system 105 of FIGS. 1-2 and of the fluid delivered to the primary load 125 in FIGS. 1-4, fluid flow 1210 through the orifice 205 such as the orifice 205 of FIGS. 2-4, the pressure 1215 at an accumulator 210 such as the accumulator 210 of FIGS. 2-4, the open valve area 1220 for a valve 405 such as the valve 405 of FIG. 4, and the flow rate through an injector 215 such as the injector 215 of FIGS. 2 and 3 and the nozzle 415 of FIG. 4.

The valve 405 may open to an area 1220 such as the valve's 405 maximum area 1270 over a first time interval 1230. The injector 215 delivers 1005 a first quantity of fluid in an injector fluid flow 1225 over the first time interval 1230 beginning at a peak flow rate 1280. The pressure 1215 at the accumulator 210 drops over the first time interval 1230 as the first quantity of fluid is delivered 1005. The fluid flow 1210 through the orifice 205 increases over the first time interval 1230 as the pressure 1215 at the accumulator 210 drops. The fluid flow 1210 through the orifice 205 decreases the pressure 1205 of the primary fluid supply system 105, but the pressure 1205 does not drop below a lower pressure range bound 1245 of the primary fluid supply system 105 pressure range.

In the second time interval 1235, the valve 405 closes to an effective area of zero (0) 1275 and the injector fluid flow 1225 drops to zero 1285. Fluid flow 1210 continues through the orifice 205 in the second time interval 1235 as the orifice 205 diverts 1010 the first quantity of fluid from the primary fluid supply system 105. As the accumulator 210 accumulates 1015 at least the first quantity of fluid as a fluid charge over the second time interval 1235, the pressure 1215 at the accumulator 210 and the primary fluid supply system pressure 1205 increase. When the accumulator 210 is charged at the end of the second time interval 1235, the orifice flow 1210 decreases to a steady state minimum flow 1255 such as no flow, and the pressure 1215 at the accumulator 210 is equal to the primary fluid supply system pressure 1205.

Figure 13:
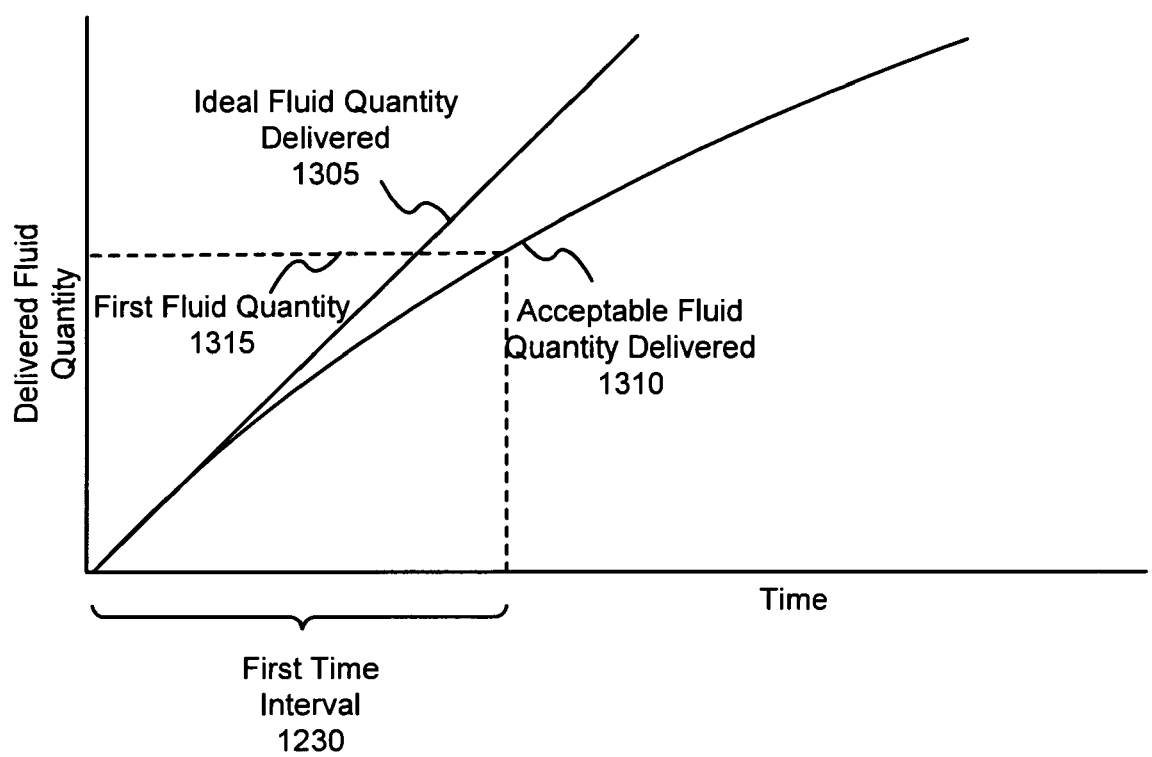
FIG. 13 is a plot illustrating one embodiment of accumulator discharge in accordance with the present invention.

FIG. 13 is a plot illustrating one embodiment of accumulator discharge 1300 in accordance with the present invention. An ideal fluid quantity delivered 1305 by an accumulator 210 such as the accumulator 210 of FIGS. 2-4 and an acceptable fluid quantity delivered 1310 by the accumulator 210 are plotted as a function of time. The ideal fluid quantity delivered 1305 represents the ideal response of the accumulator 210, where the pressure of the accumulator's 210 fluid charge does not diminish over the first time interval 1230. Unfortunately, the ideal response is approximated only when the volume of the accumulator 210 is much greater than the volume of the first quantity of fluid 1315. In a certain embodiment, the ideal response requires that the volume of the accumulator 210 be over one hundred times greater than the volume of the first quantity of fluid 1315

As a result, the volume of the accumulator 210 may be selected with the acceptable fluid quantity delivered 1310, wherein the accumulator 210 delivers the first quantity of fluid 1315 over the first time interval 1230. The volume of the accumulator 210 may only be in the range of five to ten times the volume of the first quantity of fluid 1315

Figure 14:
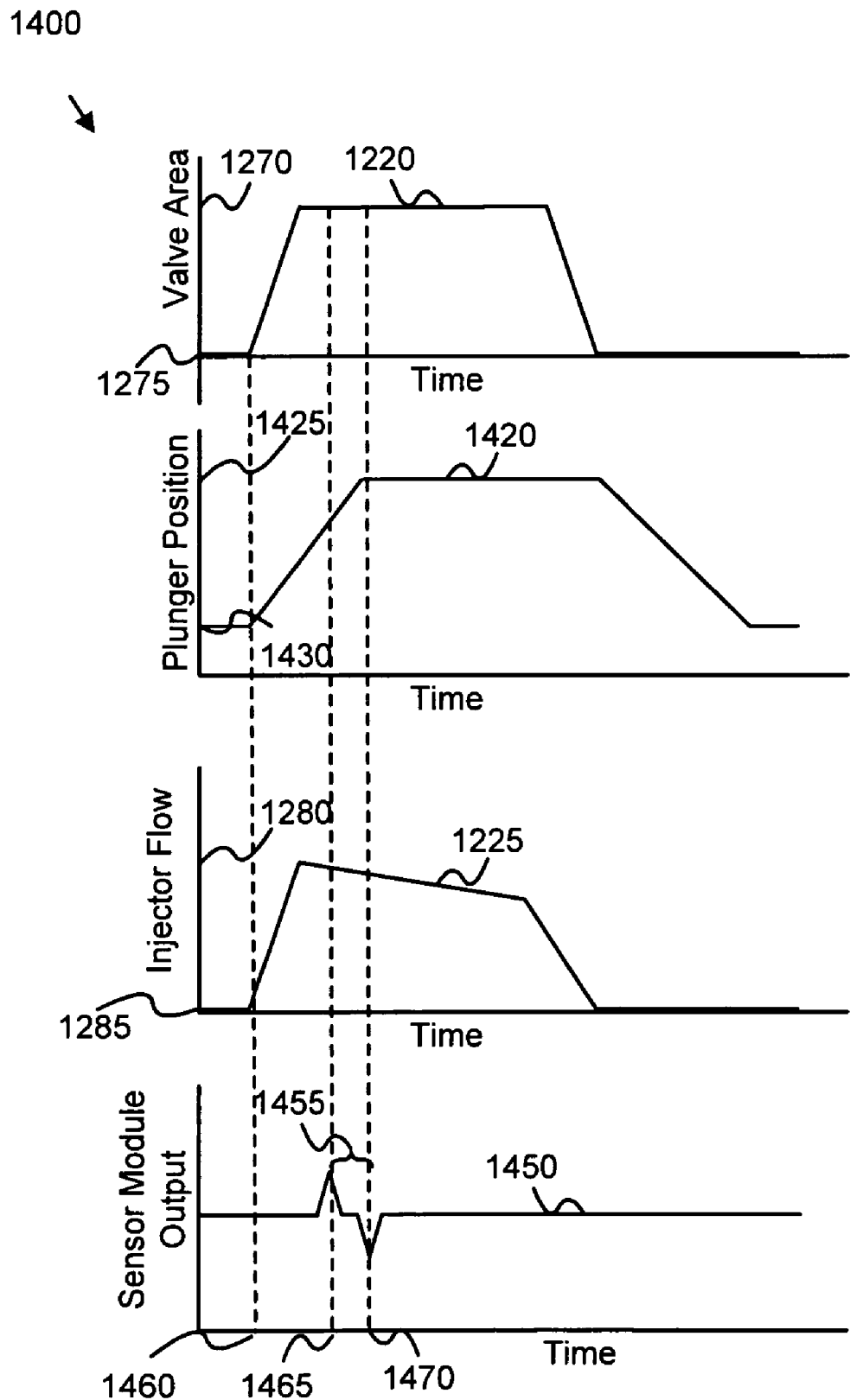
FIG. 14 is a plot of illustrating one embodiment of intermittent fluid sensor timing of the present invention.

FIG. 14 is a graph of illustrating one embodiment of intermittent fluid sensor timing plot 1400 of the present invention. The plot 1400 depicts a valve area 1220 such as the valve area 1220 of FIG. 12, a plunger position 1420 of a plunger 510 within a cavity 505 such as the plunger 510 and cavity 505 of FIGS. 5 and 6, an injector fluid flow 1225 such as the injector fluid flow 1225 of FIG. 12, and a sensor module output 1450 such as from the sensor module 535 of FIGS. 5 and 6. The plot shows valve area 1220, the plunger position 1420, the injector fluid flow 1225, and the sensor module output 1450 as functions of time.

The plunger 510 is positioned 1430 at a proximal end 515 of the cavity 505. The valve area 1220 increases from a closed position 1275 at the beginning of a first time interval 1460 to an open position 1270, delivering 1105 fluid through an injector 215 such as the injector 215 of FIGS. 2-4. The flowing fluid motivates the plunger 510 to traverse 1110 a translation distance 565 within the cavity 505 as the plunger 510 traverses to the distal end 520 of the cavity 505. In one embodiment, the sensor module 535 detects 1115 the plunger 510 approaching the sensor module 535 and generates a first pulse 1465. The sensor module 535 may also detect 1115 the plunger receding from the sensor module 535 and generate a second pulse 1470. The distance between where the sensor module 535 detects 1115 the approach of the plunger and where the sensor module 535 detects 1115 the recession of the plunger 510 is the translation distance 565. The translation distance 565 traverses a known volume of the cavity 505 such as volume V of Equation 1. The time interval between the first pulse 1465 and the second pulse 1470 may the time interval T of Equation 1.

The present invention intermittently delivers 1005 a first quantity of fluid 1315 diverted 1010 from a primary fluid supply system 105 wherein the diversion does not impair the primary fluid supply system 105 although the first quantity of fluid 1315 may be sufficient to impair the primary fluid supply system 105. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to intermittently deliver fluid, the apparatus comprising:
   a primary fluid supply system configured to supply a fluid flow to a primary load within flow rate and pressure ranges; and an auxiliary fluid delivery system configured to intermittently deliver a first quantity of fluid over a first time interval, divert the first quantity of fluid from the primary fluid supply system over a second time interval, and accumulate at least the first quantity of fluid as a fluid charge with a positive energy outside of the primary fluid supply system wherein the fluid pressure of the primary fluid supply system remains within the pressure range and the flow rate available to the primary load remains within the flow rate range, and wherein the auxiliary fluid delivery system diverts the first quantity of fluid through an orifice with an effective area A calculated as $$A \geq \frac{V_1}{\int_0^{T_2} \sqrt{\frac{2\Delta P}{\rho}}\, dt}$$

where $V_1$ is the volume of the first quantity of fluid, $T_2$ is the second time interval, $\Delta P$ is the pressure difference across the orifice, and $\rho$ is the fluid density.

2. The apparatus of claim 1, wherein the fluid is diesel fuel, the auxiliary fluid delivery system delivers the diesel fuel to a catalytic converter, and the diesel fuel aids chemical reduction of nitrogen oxides in the catalytic converter.

3. An apparatus to intermittently deliver fluid, the apparatus comprising:
an injector configured to intermittently deliver a first quantity of fluid over a first time interval;
an orifice configured to divert the first quantity of fluid from a primary fluid supply system over a second time interval, wherein the primary fluid supply system supplies fluid to a primary load within a flow rate range while the fluid pressure remains within a pressure range, and wherein the minimum effective area of the orifice A is calculated as $$A \geq \frac{V_1}{\int_0^{T_2} \sqrt{\frac{2\Delta P}{\rho}}\, dt}$$

where $V_1$ is the volume of the first quantity of fluid, $T_2$ is the second time interval, $\Delta P$ is the pressure difference across the orifice, and $\rho$ is the fluid density; and
an accumulator configured to accumulate at least the first quantity of fluid as a fluid charge with a positive energy outside of the primary fluid supply system.

4. The apparatus of claim 3, wherein the injector is configured to inject the fluid into a port to a high-temperature environment, the injector comprising an internal heat path with a small length, large cross-sectional area, and high conductivity wherein the fluid conducts heat from the internal heat path, and further comprising a mounting member configured to mount the injector to the port wherein the injector is recessed from the high-temperature environment, an air void is between the injector and the mounting member, the mounting member supports the injector with a plurality of insulating fingers, and the mounting member comprises a plurality of perforations that increase surface area of the mounting member and the length of the thermal path across the mounting member, and a seal configured to connect the mounting member and the injector, wherein the seal is thin, resilient, an insulator, and contacts the injector over a small area.

5. The apparatus of claim 3, wherein the injector comprises:
a valve configured to control the flow of fluid from the injector;
a meter configured to measure the flow of fluid through the valve; and
a nozzle configured to atomize and disperse the fluid.

6. An apparatus of claim 5, the meter further comprising:
a cavity with a proximal end and a distal end configured for fluid to flow through the cavity from the proximal end to the distal end;
a plunger positioned within the cavity to prevent the flow of fluid around the plunger, the plunger configured to traverse a translation distance though the cavity in response to the fluid flowing through the cavity;
a sensor module configured to detect the plunger traversing the translation distance; and
a control module configured to calculate a fluid flow rate as the volume of the cavity over the translation distance divided by the time interval for the plunger to traverse the translation distance.

7. The apparatus of claim 5, wherein the valve delivers the fluid responsive to a command from a primary fluid supply system control module.

8. The apparatus of claim 7, wherein the primary fluid supply system control module commands the flow of fluid through the valve responsive to a measure of the flow of fluid.

9. The apparatus of claim 8, wherein the fluid is a reducant and the injector delivers the reducant to a catalytic converter wherein the reducant aids chemical reduction of nitrogen oxides in the catalytic converter.

10. The apparatus of claim 3, wherein the minimum volume of the accumulator 210 $V_A$ is calculated as $$V_A \geq \frac{V_1}{\left(\frac{P_{MT}+1}{P_{Min}+1}\right)^b - \left(\frac{P_{MT}+1}{P_{Max}+1}\right)^b}$$

where $V_1$ is the volume of the first quantity of fluid, $P_{Min}$ is a lower pressure range bound of the pressure range, $P_{Max}$ is an upper pressure range bound of the pressure range, $P_{MT}$ is accumulator precharge pressure at a maximum temperature, and b is a constant.

11. The apparatus of claim 3, wherein the orifice diverts fluid in the range of zero point 1 percent to five percent of the fluid supplied by the primary fluid supply system.

12. The apparatus of claim 3, wherein the primary fluid supply system is a low-pressure fuel delivery system.

13. The apparatus of claim 12, wherein the pressure range is in the range of two to twenty-five bar absolute.

14. The apparatus of claim 3, wherein the primary fluid supply system is a high-pressure fuel delivery system.

15. A system to intermittently deliver fluid, the system comprising:
a primary fluid supply system configured supply a fluid to a primary load within a flow rate range while the fluid pressure remains within a pressure range;
an injector configured to intermittently deliver a first quantity of fluid over a first time interval;
an orifice configured to divert the first quantity of fluid from the primary fluid supply system over a second time interval, wherein the primary fluid supply system fluid remains within the pressure range and the minimum effective area of the orifice A is calculated as $$A \geq \frac{V_1}{\int_0^{T_2} \sqrt{\frac{2\Delta P}{\rho}}\, dt}$$

where $V_1$ is the volume of the first quantity of fluid, $T_2$ is the second time interval, $\Delta P$ is the pressure difference across the orifice, and $\rho$ is the fluid density; and an accumulator configured to accumulate at least the first quantity of fluid as a fluid charge with a positive energy outside of the primary fluid supply system.

16. The system of claim 15, wherein the primary fluid supply system is a diesel engine fluid supply system, the fluid is diesel fuel, and the injector delivers the diesel fuel to a catalytic converter wherein the diesel fuel aids chemical reduction of nitrogen oxides in the catalytic converter.

17. The system of claim 15, further comprising a primary fluid supply system control module configured to command the injector to deliver fluid.

18. A method for intermittently delivering fluid, the method comprising:

intermittently delivering a first quantity of fluid over a first time interval;

diverting the first quantity of fluid from a primary fluid supply system over a second time interval through an effective area A calculated as $$A \geq \frac{V_1}{\int_0^{T_2} \sqrt{\frac{2\Delta P}{\rho}}\, dt}$$

where
$V_1$ is the volume of the first quantity of fluid, $T_2$ is the second time interval, $\Delta P$ is the pressure difference across the orifice, and $\rho$ is the fluid density, wherein the primary fluid supply system supplies fluid to a primary load within a flow rate range while the fluid pressure remains within a pressure range; and accumulating at least the first quantity of fluid as a fluid charge with a positive energy outside of the primary fluid supply system.

19. The method of claim 18, wherein the fluid is diesel fuel and the diesel fuel is delivered to a catalytic converter wherein the diesel fuel aids chemical reduction of nitrogen oxides in the catalytic converter.

20. The method of claim 18, further comprising accumulating the at least first quantity of fluid in a minimum volume $V_A$ is calculated as $$V_A \geq \frac{V_1}{\left(\frac{P_{MT}+1}{P_{Min}+1}\right)^b - \left(\frac{P_{MT}+1}{P_{Max}+1}\right)^b}$$

where $V_1$ is the volume of the first quantity of fluid, $P_{Min}$ is a lower pressure range bound of the pressure range, $P_{Max}$ is an upper pressure range bound of the pressure range, $P_{MT}$ is accumulator precharge pressure at a maximum temperature, and b is a constant.

21. An apparatus to intermittently deliver fluid, the apparatus comprising:

means for intermittently delivering a first quantity of fluid over a first time interval;

means for diverting the first quantity of fluid from a primary fluid supply system over a second time interval, wherein the diverting means has an effective area A calculated as $$A \geq \frac{V_1}{\int_0^{T_2} \sqrt{\frac{2\Delta P}{\rho}}\, dt}$$

where $V_1$ is the volume of the first quantity of fluid, $T_2$ is the second time interval, $\Delta P$ is the pressure difference across the orifice, and $\rho$ is the fluid density and the primary fluid supply system supplies fluid to a primary load within a flow rate range while the fluid pressure remains within a pressure range; and means for accumulating at least the first quantity of fluid as a fluid charge with a positive energy outside of the primary fluid supply system.

* * * * *